United States Patent
Kim et al.

(10) Patent No.: US 8,203,678 B2
(45) Date of Patent: Jun. 19, 2012

(54) LIQUID CRYSTAL DISPLAY WITH PROTRUDING SUB-PIXEL ELECTRODE

(75) Inventors: Jae-Hyun Kim, Suwon-si (KR); Gee-Bun Kim, Gyeonggi-do (KR); Ae Shin, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 550 days.

(21) Appl. No.: 12/362,365

(22) Filed: Jan. 29, 2009

(65) Prior Publication Data

US 2009/0190081 A1    Jul. 30, 2009

(30) Foreign Application Priority Data

Jan. 30, 2008  (KR) .................. 10-2008-0009740

(51) Int. Cl.
  *G02F 1/1337*  (2006.01)
  *G02F 1/1343*  (2006.01)

(52) U.S. Cl. ......... 349/129; 349/128; 349/130; 349/144

(58) Field of Classification Search .................. 349/144, 349/128–130
See application file for complete search history.

(56) References Cited

U.S. PATENT DOCUMENTS

| | | | |
|---|---|---|---|
| 7,098,978 B2 * | 8/2006 | Chen et al. .................. 349/129 |
| 7,511,789 B2 * | 3/2009 | Inoue et al. .................. 349/129 |
| RE43,123 E * | 1/2012 | Sasabayashi et al. ......... 349/117 |
| 2004/0125297 A1 * | 7/2004 | Lee .............................. 349/129 |
| 2005/0078263 A1 * | 4/2005 | Kim et al. ..................... 349/144 |
| 2005/0200789 A1 * | 9/2005 | Nakanishi .................... 349/139 |
| 2009/0021660 A1 * | 1/2009 | Lu et al. ........................ 349/42 |

* cited by examiner

*Primary Examiner* — Huyen Ngo
(74) *Attorney, Agent, or Firm* — Innovation Counsel LLP

(57) ABSTRACT

A pixel unit of a liquid crystal display includes a first sub-pixel electrode coupled by a direct current path to a corresponding switching element and a second sub-pixel electrode capacitively connected to the first sub-pixel electrode. The second sub-pixel electrode has a protrusion extending upwardly toward a spaced apart common electrode. The common electrode has a cut-out directly above the protrusion.

7 Claims, 10 Drawing Sheets

LIQUID CRYSTAL DISPLAY WITH PROTRUDING SUB-PIXEL ELECTRODE

CROSS-REFERENCE TO RELATED APPLICATION

This application claims priority from Korean Patent Application No. 10-2008-0009740 filed on Jan. 30, 2008 in the Korean Intellectual Property Office, the disclosure of which is incorporated herein by reference in its entirety.

BACKGROUND OF THE INVENTION

1. Field of the Invention

The present invention relates to a liquid crystal display, and more particularly, to a liquid crystal display having improved lateral visibility.

2. Description of the Related Art

Liquid crystal displays (LCDs) are one of the most widely used types of flat panel displays, and typically include two substrates, or panels, having a plurality of field-generating electrodes, including pixel electrodes and a common electrode, arranged thereon, with a layer of a liquid crystal material being interposed between the two panels. LCDs control the transmittance of light incident on the panels by the application of selected voltages to the field-generating electrodes so as to generate electric fields, which determine the orientation of the liquid crystal molecules in the liquid crystal layer and thereby adjust the polarization of the light incident upon the panel.

In a "vertical alignment" (VA) mode LCD display a wide viewing angle is achieved by forming cutouts in the field-generating electrodes. A pixel region of the VA mode LCD is divided into a plurality of domains so that the orientation of the liquid crystal molecules can be determined by the cutouts that enable the inclinations of the molecules to be distributed in various directions within the pixel, thereby widening the reference viewing angle.

However, VA mode LCDs have relatively poor lateral visibility as compared to their frontal visibility.

Accordingly, demands have been increased for a structure capable of varying a gamma curve of each sub-pixel while minimizing an aperture ratio.

SUMMARY OF THE INVENTION

The present invention provides a liquid crystal display having improved lateral visibility.

The above and other features of the present invention are described below in or will be apparent from the following description of the preferred embodiments.

According to an aspect of the present invention, there is provided a liquid crystal display including a first insulating substrate, a gate line and a data line provided on the first insulating substrate to cross each other, a first sub-pixel electrode connected to the gate line and the data line, a second sub-pixel electrode capacitively connected to the first sub-pixel electrode, a second insulating substrate opposite to and facing the first insulating substrate, a common electrode formed on the second insulating substrate, and a cut-out pattern formed on the common electrode in a hole shape.

According to another aspect of the present invention, there is provided a liquid crystal display including a first insulating substrate, a gate line and a data line provided on the first insulating substrate to cross each other, a first sub-pixel electrode connected to the gate line and the data line, a second sub-pixel electrode capacitively connected to the first sub-pixel electrode, and a protrusion formed on the second sub-pixel electrode in a hole shape.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
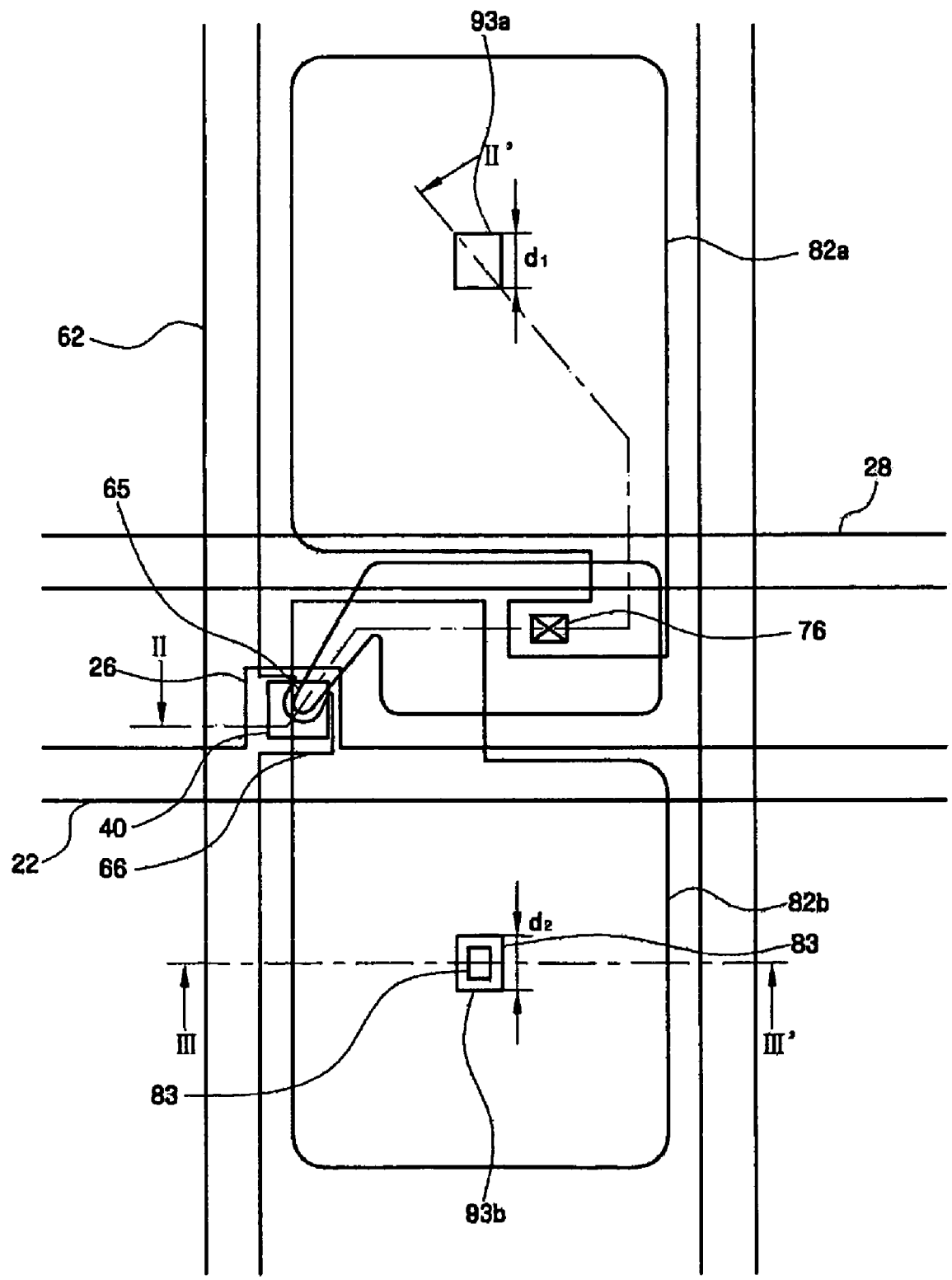
FIG. 1 is a plan view of a liquid crystal display according to a first embodiment of the present invention.

Advantages and features of the present invention and methods of accomplishing the same will be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Furthermore, relative terms, such as "below," "beneath" or "lower" and "above" or "upper" may be used herein to describe one element's relationship to another element as illustrated in the drawings. It will be understood that relative terms are intended to encompass different orientations of the device in addition to the orientation depicted in the drawings. Like reference numerals refer to like elements throughout.

Figure 3:
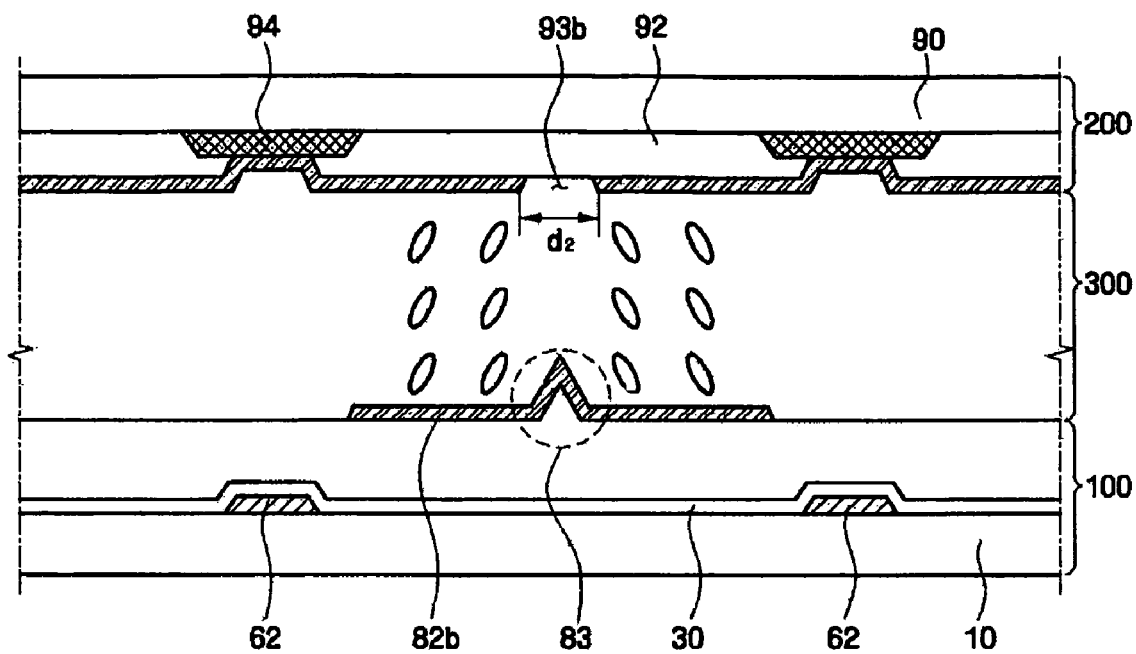
FIG. 3 is a sectional view of the liquid crystal display shown in FIG. 1 taken along the line III-III'.
Figure 4:
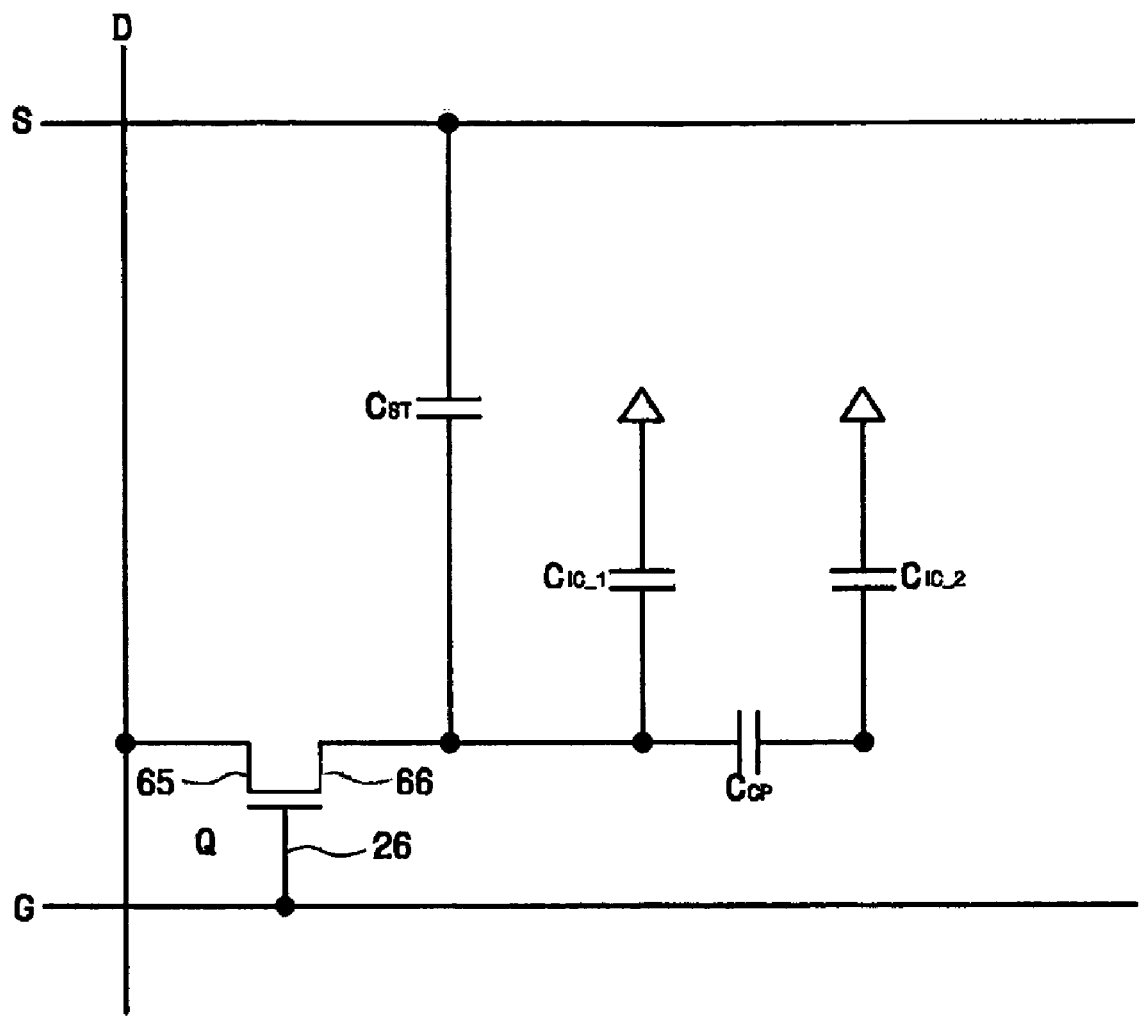
FIG. 4 is an equivalent circuit diagram of one pixel of a liquid crystal display of FIG. 1.

Hereinafter, a liquid crystal display according to a first embodiment of the present invention is described in detail with reference to FIGS. 1 through 4. FIG. 1 is a plan view of a liquid crystal display according to a first embodiment of the present invention, FIG. 2 is a sectional view of the liquid crystal display shown in FIG. 1 taken along the line II-II', FIG. 3 is a sectional view of the liquid crystal display shown in FIG. 1 taken along the line III-III', and FIG. 4 is an equivalent circuit diagram of one pixel of a liquid crystal display of FIG. 1.

Figure 2:
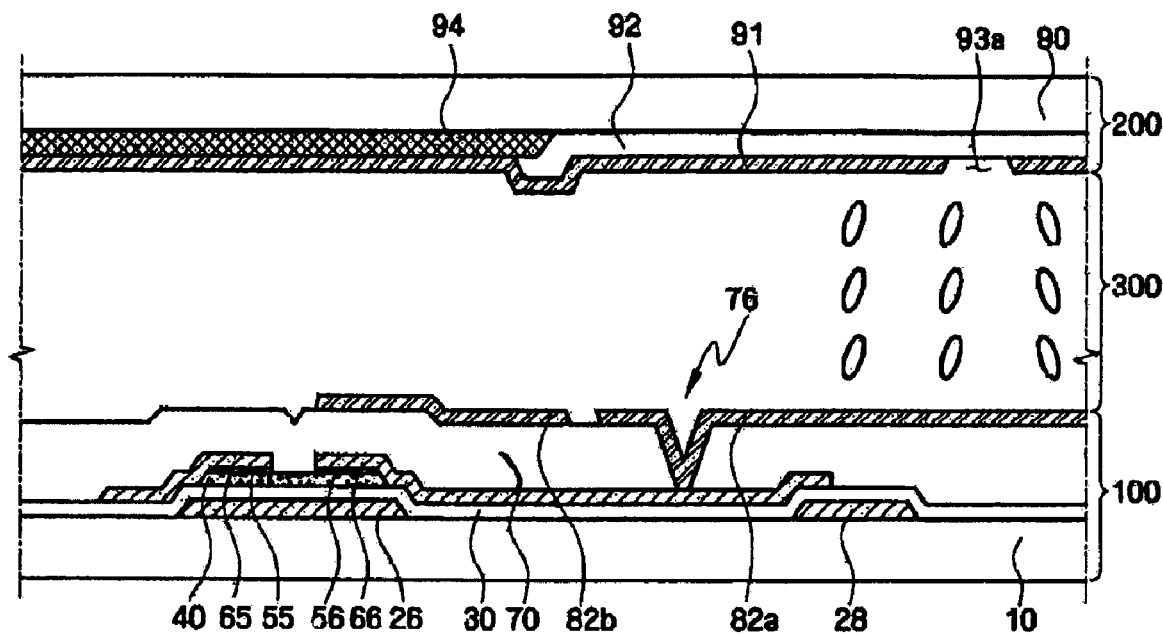
FIG. 2 is a sectional view of the liquid crystal display shown in FIG. 1 taken along the line II-II'.

Referring to FIGS. 1 and 2, the liquid crystal display according to a first embodiment of the present invention includes a first display panel 100 having a thin film transistor array, a second display panel 200 opposite thereto and having a common electrode 91, and a liquid crystal layer 300 interposed between the first and second display panels 100 and 200.

The first display panel 100 is described below in detail. A gate line 22 for transmitting gate signals extend on a first insulating substrate 10 preferably made of transparent glass substantially in a transverse direction. The gate line 22 is allocated to each one of pixels, and a gate electrode 26 extending upwardly is formed in the gate line 22. The gate line 22 and the gate electrode 26 are collectively referred to as a gate wire (22, 26).

A storage line 28 is formed on the first insulating substrate 10. The storage line 28 extends in a transverse direction substantially parallel to the gate line 22 and overlaps a first sub-pixel electrode 82a, which will be described later, within a unit pixel. The shape and arrangement of the storage line 28 may be modified from that shown in the particularly exemplary embodiment illustrated. However, the shape and arrangement of the storage line 28 can be modified as long as conditions of forming the storage capacitor with the first sub-pixel electrode 82a are satisfied.

The gate wire (22, 26) and the storage line 28 121 can be made of an aluminum group metal such as aluminum (Al) and an aluminum alloy, a silver group metal such as silver (Ag) and a silver alloy, a copper group metal such as copper (Cu) and a copper alloy, a molybdenum group metal such as molybdenum (Mo) and a molybdenum alloy, chromium (Cr), tantalum (Ta), or titanium (Ti). However, they can have a multilayer structure having two conductive layers (not shown) with different physical properties. A conductive layer among them can be made of a metal having low resistivity, for example an aluminum group metal, a silver group metal, or a copper group metal in order to reduce signal delay or voltage drop. For example, the other conductive layer can be made of a different material having excellent physical, chemical and electrical contact characteristics to indium tin oxide ("ITO") and indium zinc oxide ("IZO"), for example a molybdenum group metal, chromium, titanium, or tantalum. Such a composition can be a chromium lower layer and an aluminum (alloy) upper layer, or an aluminum (alloy) lower layer and a molybdenum (alloy) upper layer. However, the gate wire (22, 26) can have a multilayer structure having two conductive layers (not shown) with different physical properties. A conductive layer among them can be made of a metal having low resistivity, for example an aluminum group metal, a silver group metal, or a copper group metal in order to reduce signal delay or voltage drop of the gate wire (22, 26). On the contrary, the other conductive layer can be made of a different material having excellent physical, chemical and electrical contact characteristics to indium tin oxide ("ITO") and indium zinc oxide ("IZO"), for example a molybdenum group metal, chromium, titanium, or tantalum. For example, such a composition can be a chromium lower layer and an aluminum (alloy) upper layer, or an aluminum (alloy) lower layer and a molybdenum (alloy) upper layer. However, the gate wire (22, 26) can be made of various metals or conductors besides the materials described above.

A gate insulating layer 30 made of made of silicon nitride (SiNx) is disposed on the first insulating substrate 10 and the gate line 22.

A semiconductor layer 40 made of hydrogenated amorphous silicon or polysilicon is disposed on the gate insulating layer 30. The semiconductor layer 40 may have various shapes such as island shapes or stripe shapes. In the illustrative embodiment, for example, the semiconductor layer 40 may be formed in an island shape.

Ohmic contact layers 55 and 56 made of silicide or n+hydrogenated amorphous silicon heavily doped with n-type impurity are disposed on the semiconductor layer 40. The ohmic contacts 55 and 56 are provided on the semiconductor layer 40 in pairs.

A data line 62 and a drain electrode 66 corresponding to the data line 62 are formed over the ohmic contact layers 55 and 56 and the gate insulating layer 30.

The data line 62 extends substantially along a longitudinal direction, intersects the gate line 22, and transmits a data voltage. A source electrode 65 is formed on the data line 62 and extends toward the drain electrode 66. The drain electrode 66 transmits a data signal to a pixel electrode 82. The data line 62, the source electrode 65, and the drain electrode 66 are collectively referred to as a data wire.

The data wire (62, 65, 66) is preferably made of a refractory metal such as Cr, a metal containing Mo, Ta, or Ti, and may have a multiple-layered structure comprised of a lower layer (not shown) made of a refractory metal, and an upper layer (not shown) made of a low resistance material. Examples of the multi-layered structure include a double-layered structure having an upper Cr film and an upper Al film or a lower Al film and an upper Mo film, and a triple-layered structure having a lower Mo film, an intermediate Al film, and an upper Mo film.

At least a portion of the source electrode 65 overlaps the semiconductor layer 40. The drain electrode 66 is opposite to and faces the source electrode 65, in view of the gate electrode 26, and at least a portion of the drain electrode 66 overlaps the semiconductor layer 40. Here, the ohmic contacts 55 and 56 are interposed between the underlying semiconductor layer 40 and the overlying source electrode 65 and between the underlying semiconductor layer 40 and the drain electrode 66 to reduce the contact resistance between them.

The drain electrode 66 has one end facing the source electrode 65 and the other end extended to overlap a second sub-pixel electrode 82b, which is described below, so that the drain electrode 66 is capacitively coupled with the second sub-pixel electrode 82b, and a portion of the other end of the drain electrode 66 is electrically connected to the first sub-pixel electrode 82a.

A passivation layer 70 may be formed on the data wire (62, 65, 66), and exposed portions of the semiconductor layer 40. Here, the passivation layer 70 is preferably made of an inorganic insulator such as silicon nitride or silicon oxide, a photosensitive organic material having a good flatness characteristic, or a low dielectric insulating material such as a-Si:C:O and a-Si:O:F formed by plasma enhanced chemical vapor deposition (PECVD). In order to prevent an organic material of the passivation layer 70 from contacting the exposed portions of the semiconductor layer 40 while ensuring excellent properties of an organic layer, the passivation layer 70 may be formed of a double-layered structure comprised of a lower inorganic layer and an upper organic layer. Further, red, green and blue color filter layers may be used as the passivation layer 70.

In order to increase coupling capacitance between the first sub-pixel electrode 82a and the second sub-pixel electrode 82b, the passivation layer 70 may be formed of silicon oxide ($SiO_2$) to a thickness of 1000 Å or less. A contact hole 76 is formed in the passivation layer 70. The pixel electrode 82 is physically and electrically connected to the drain electrode 66 via the contact hole 76 to be supplied with a data voltage and control voltage from the drain electrode 66.

The pixel electrode disposed on the passivation layer 70 is shaped in the form of a pixel. The pixel electrode disposed on the passivation layer 70 includes the first sub-pixel electrode 82a and the second sub-pixel electrode 82b arranged in parallel with the data line 62. The first sub-pixel electrode 82a and the second sub-pixel electrode 82b are spaced at a constant distance apart from each other. The first sub-pixel electrode 82a and the second sub-pixel electrode 82b may be formed in various shapes, such as a circular shape, a rectangular shape.

The first sub-pixel electrodes 82a is electrically connected to the drain electrode 66 via the contact hole 76, and the second sub-pixel electrode 82b is coupled, but not directly, to the drain electrode 66 through capacitive coupling.

The first sub-pixel electrode 82a and the second sub-pixel electrode 82b are made of a transparent conductor such as ITO or IZO, or a reflective conductor such as Al.

The first sub-pixel electrode 82a is physically and electrically connected to the drain electrode 66 via the contact hole 76 and is supplied with a data voltage from the drain electrode 66. The second sub-pixel electrode 82b is electrically floated, but overlaps the drain electrode 66 to be capacitively coupled to the first sub-pixel electrode 82a. In other words, the voltage of the second pixel electrode 82 depends on the voltage of the first pixel electrode 82a. Here, the voltage of the second pixel electrode 82b is always smaller than that of the first pixel electrode 82a. The voltage dependency of the first sub-pixel electrode 82a and the second sub-pixel electrode 82b is not limited to the illustrated manner. Rather, the data voltage of the drain electrode 66 may be applied to the second sub-pixel electrode 82b, and first sub-pixel electrode 82a may be capacitively coupled to the second sub-pixel electrode 82b.

As shown in FIG. 3, protrusion 83 extending upwardly may be provided at the center of the second sub-pixel electrode 82b. The protrusion 83 provides a lateral electric field angle between a second cut-out pattern 93b and the second sub-pixel electrode 82b to be formed gently, thereby adjusting the luminance in the vicinity of the second cut-out pattern 93b. In other words, the first sub-pixel electrode 82a is responsible for a relatively high luminance area, and the second sub-pixel electrode 82b is responsible for a relatively low luminance area, thereby the adjusting the luminance by adjusting the width of the protrusion 83. The protrusion 83 may be formed to overlap the second cut-out pattern 93b of a common electrode 91, which will later be described. The width of the protrusion 83 is preferably smaller than a width d2 of the second cut-out pattern 93b, which will later be described.

The protrusion 83 may be a double-layered structure formed in such a manner that the passivation layer 70 serves a lower layer made of an organic film, and the pixel electrode (82a, 82b) serves as an upper layer. The protrusion 83 can be formed to be higher than other portions by partially exposing the passivation layer 70 using a slit mask or a semi-transmissive mask during patterning of the passivation layer 70.

In addition, the protrusion 83 may have a stacked structure having the gate line 22, the data line 62, the semiconductor layer 40, and an organic insulator layer. That is to say, when forming the gate line 22, the data line 62, the semiconductor layer 40, and the passivation layer 70, a metal used for the gate line 22, a metal used for the data line 62, a semiconductor material, and an organic material are sequentially stacked at a portion overlapping the second cut-out pattern 93b disposed on the first insulating substrate 10, thereby allowing the corresponding portion to protrude upwardly. Thereafter, the second sub-pixel electrode 82b is formed on the corresponding portion, thereby forming the protrusion 83. A height of the protrusion 83 is preferably in a range of about 0.15 to about 0.4 μm in consideration of a cell gap.

As described above, the two sub-pixel electrodes 82a and 82b having different data voltages are arranged in a unit pixel, so that the voltage variation can be compensated, thereby reducing the distortion of a gamma curve and widening a reference viewing angle. The combination of the first sub-pixel electrode 82a and the second sub-pixel electrode 82b will later be described in more detail with reference to FIG. 4.

The second display panel (200 of FIG. 2) is described below.

A black matrix 94 for preventing light leakage and defining a pixel area is formed on a second insulating substrate 90 such as transparent glass. The black matrix 94 may be formed at portions corresponding to the gate line 22 and the data line 62 and a portion corresponding to a thin film transistor. In addition, the black matrix 94 may have various shapes in order to prevent light leakage in the vicinity of the pixel electrode 82 and the thin film transistor. The black matrix 94 may be formed of a metal (metal oxide) such as such as chromium (Cr) or chromium oxide ($Cr_xO_y$), or an organic black resist.

Red, green and blue color filters 92 are sequentially arranged in a pixel area between neighboring black matrixes.

An overcoat layer (not shown) may be formed on the color filters 92 to improve the flatness of the black matrix 94 having a stepped structure.

The common electrode 91 made of a transparent conductor made of ITO or IZO is formed on the overcoat layer. The common electrode 91 is opposite to and faces the first sub-pixel electrode 82a and the second sub-pixel electrode 82b, and a liquid crystal layer is interposed between the common electrode 91 and the pixel electrode 82.

An alignment layer (not shown) for aligning liquid crystal molecules is coated on the common electrode 91.

The common electrode 91 includes a first cut-out pattern 93a and a second cut-out pattern 93b formed at portions overlapping the first and second sub-pixel electrodes 82a and 82b, respectively.

The first cut-out pattern 93a may be formed at a portion corresponding to the center of the first sub-pixel electrode 82a, and the second cut-out pattern 93b may be formed at a portion corresponding to the center of the second sub-pixel electrode 82b. The first cut-out pattern 93a and the second cut-out pattern 93b extend through the thickness of the common electrode 91. The first cut-out pattern 93a and the second cut-out pattern 93b may have various sectional shapes, including for example a rectangular shape, or a circular shape.

When voltages are applied between the pixel electrode (82a, 82b) and the common electrode 91, the cut-out patterns 93a and 93b cause a change in the electric field therebetween, thereby determining an orientation of liquid crystal molecules in the liquid crystal layer. If the voltages are applied to the pixel electrode (82a, 82b) and the common electrode 91, electric fields in a lateral direction with respect to the cut-out patterns 93a and 93b are generated between the pixel electrode (82a, 82b) and the common electrode 91 because no voltage is directly applied to the cut-out patterns 93a and 93b. Accordingly, the liquid crystal molecules are tilted toward the cut-out patterns 93a and 93b, so that the overall orientation of the liquid crystal molecules becomes radial with respect to the cut-out patterns 93a and 93b.

The second sub-pixel electrode 82b to which a relatively low voltage is applied, is responsible for a low gray level, compared to the first sub-pixel electrode 82a. Accordingly, a width d2 of the second cut-out pattern 93b is made greater than a width d1 of the first cut-out pattern 93a, so that the second cut-out pattern 93b has a relatively low brightness value. Preferably, the width d2 of the second cut-out pattern 93b is greater than a width of the protrusion 83.

In FIG. 4, $C_{lc\_1}$ denotes liquid crystal capacitance formed between the first sub-pixel electrode 82a and the common electrode 91, $C_{ST}$ denotes storage capacitance formed between the first sub-pixel electrode 82a and the storage line 28, $C_{lc\_2}$ denotes liquid crystal capacitance formed between the second sub-pixel electrode 82b and the common electrode 91, and $C_{CP}$ denotes coupling capacitance formed when the first sub-pixel electrode 82a and the second sub-pixel electrode 82b are capacitively coupled to each other.

Referring to FIG. 4, a thin film transistor of each pixel Q is a three-terminal element having the gate electrode 26 connected to a gate line G, the source electrode 65 connected to a data line D, and the drain electrode 66 connected to the liquid crystal capacitors $C_{lc\_1}$, $C_{lc\_2}$ and the storage capacitor $C_{ST}$.

Assuming that a voltage of the first sub-pixel electrode 82a relative to the common electrode 91 is denoted by Va, a voltage Vb of the second sub-pixel electrode 82b is represented based on the principle of voltage division as follows:

$$Vb = Va \times [C_{CP}/(C_{CP}+C_{lc\_2})]$$

where Vb is always smaller than Va because $C_{CP}/(C_{CP}+C_{lc\_2})$ is always smaller than 1. A proportion of Vb to Va can be adjusted by adjusting the value of $C_{CP}$. The adjusting of the $C_{CP}$ value can be made by adjusting an overlapping area of the second sub-pixel electrode 82b and the drain electrode 66 or a distance therebetween. The electrode that is capacitively coupled to the second sub-pixel electrode 82b by overlapping is not limited to the drain electrode 66, as described above, other metal layers can be coupled to the second sub-pixel electrode 82b, and various coupling methods can be employed other than the illustrated exemplary manner, i.e., overlapping, which will later be described in detail.

Figure 5:
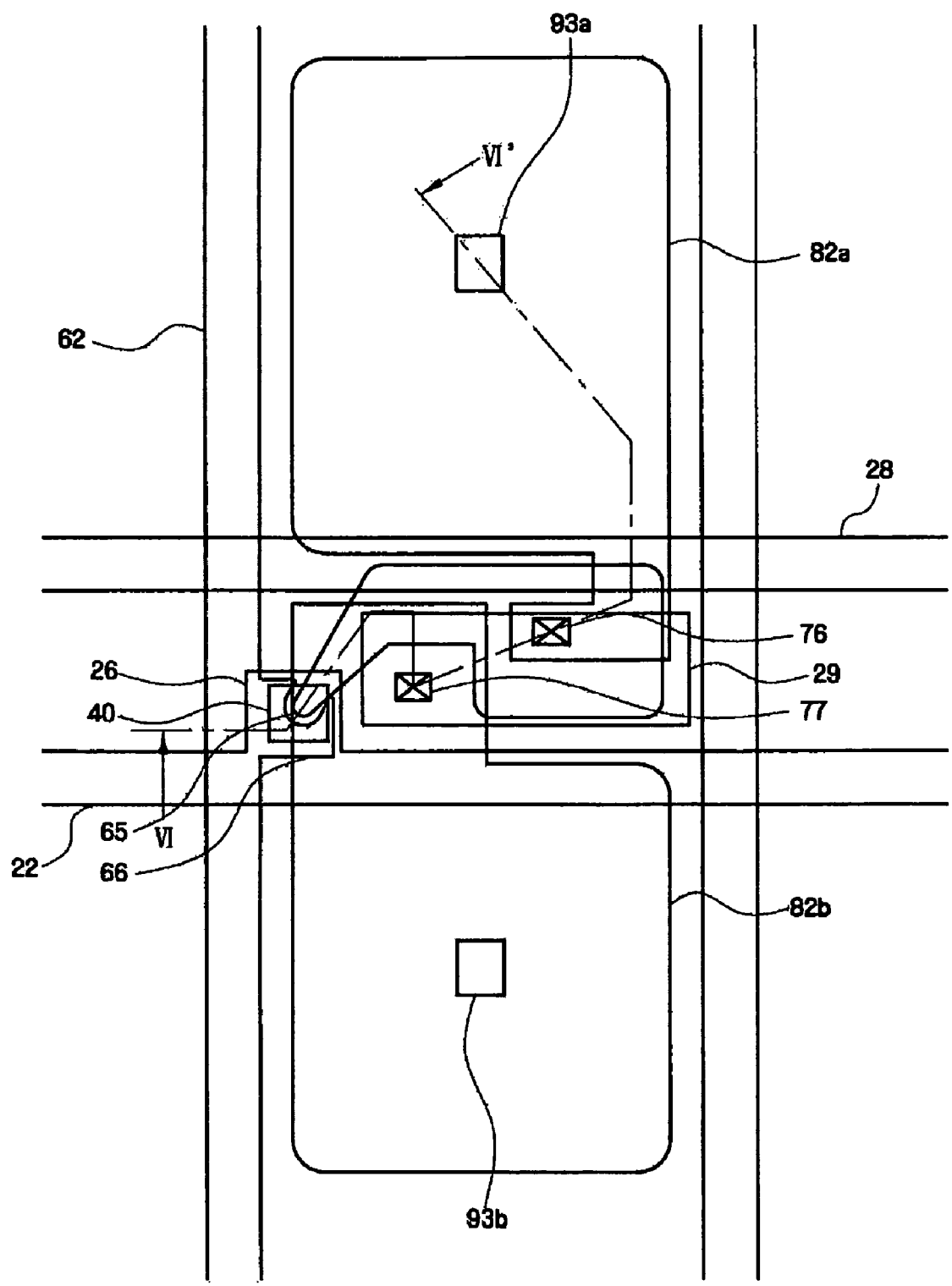
FIG. 5 is a plan view of a liquid crystal display according to a second embodiment of the present invention.
Figure 6:
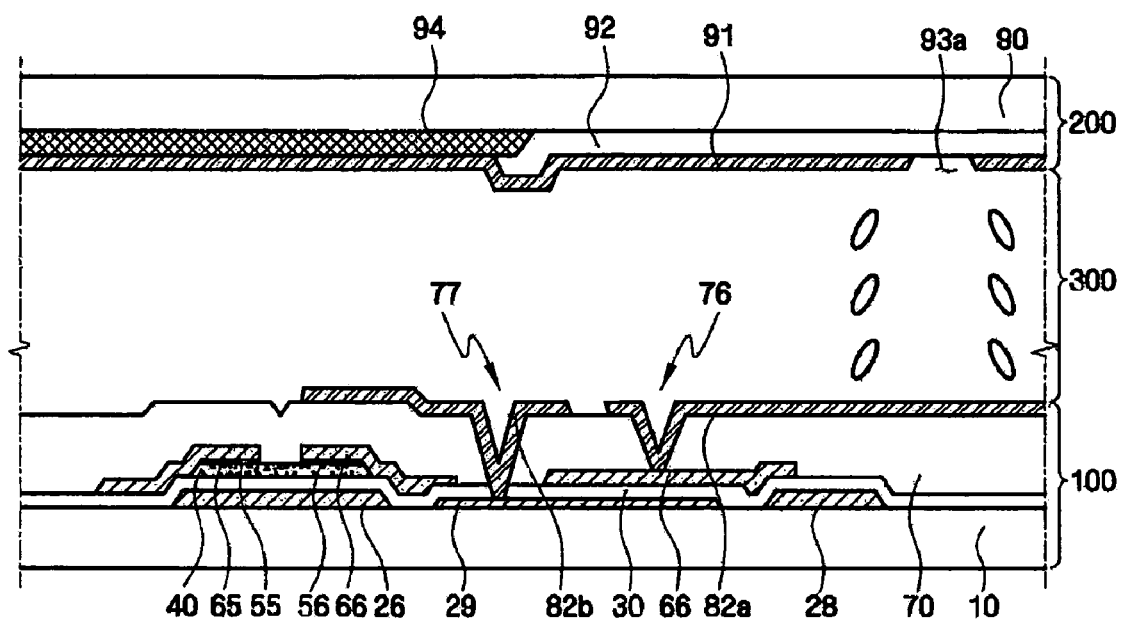
FIG. 6 is a sectional view of the liquid crystal display shown in FIG. 5 taken along the line VI-VI'.

A liquid crystal display according to a second embodiment of the present invention is described below in detail with reference to FIGS. 5 and 6. FIG. 5 is a plan view of a liquid crystal display according to a second embodiment of the present invention, and FIG. 6 is a sectional view of the liquid crystal display shown in FIG. 5 taken along the line VI-VI'. For convenience of description, components having substantially the same function as the exemplary embodiment shown in FIGS. 1 through 4 are identified by the same reference numerals, and detailed descriptions thereof are not repeated. Referring to FIGS. 5 and 6, the liquid crystal display according to the second embodiment has substantially the same structure as the liquid crystal display of the previous embodiment except that a first sub-pixel electrode 82a and a second sub-pixel electrode 82b are capacitively coupled to each other through a floating electrode 29.

The second sub-pixel electrode 82b is connected to the floating electrode 29 via a contact hole 77. The first sub-pixel electrode 82a is capacitively coupled to the floating electrode 29 which is connected to the second sub-pixel electrode 82b. The floating electrode 29 may be formed on the first insulating substrate 10 together with the gate line 22. That is to say, during forming of the gate line 22, the floating electrode 29 and the gate line 22 may be formed using the same material to be insulated from each other, and a gate insulating layer 30 may be formed thereon.

The floating electrode 29 overlaps the drain electrode 66 connected to the first sub-pixel electrode 82a, forming a capacitor by means of the gate insulating layer 30. A voltage is applied to the second sub-pixel electrode 82b by the capacitor formed by the floating electrode 29 and the drain electrode 66.

The second sub-pixel electrode 82b partially overlaps the drain electrode 66 as well, thereby forming a capacitor. Since the drain electrode 66 overlaps the second sub-pixel electrode 82b and the floating electrode 29, the overall overlapping area is increased, thereby increasing charge capacitance.

In addition, the drain electrode 66 partially overlaps the storage line 28 to form a storage capacitor. The shapes and positions of the drain electrode 66, the floating electrode 29, and the storage line 28 may vary in different manners according to the arrangement of pixels.

Figure 7:
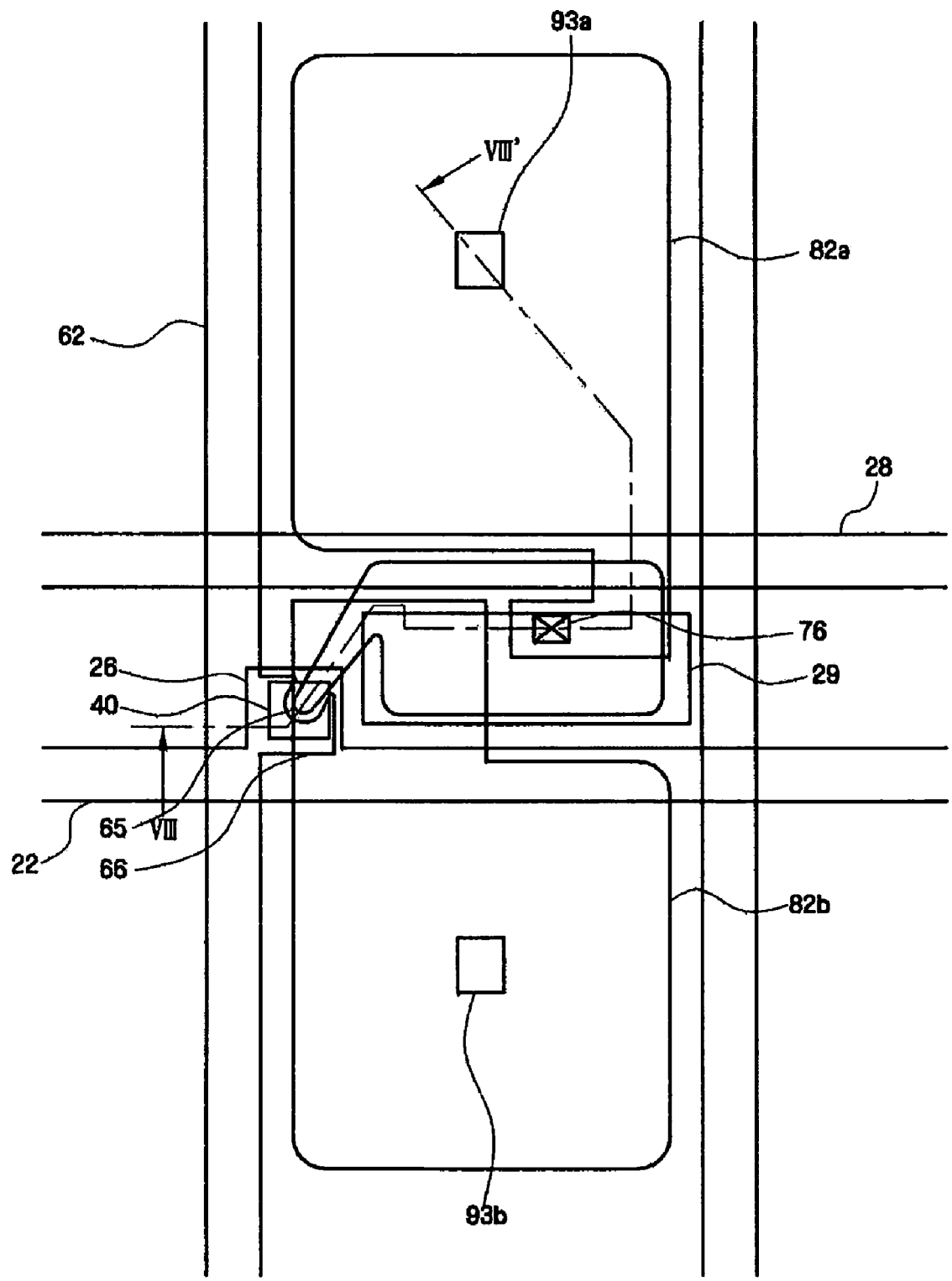
FIG. 7 is a plan view of a liquid crystal display according to a third embodiment of the present invention.
Figure 8:
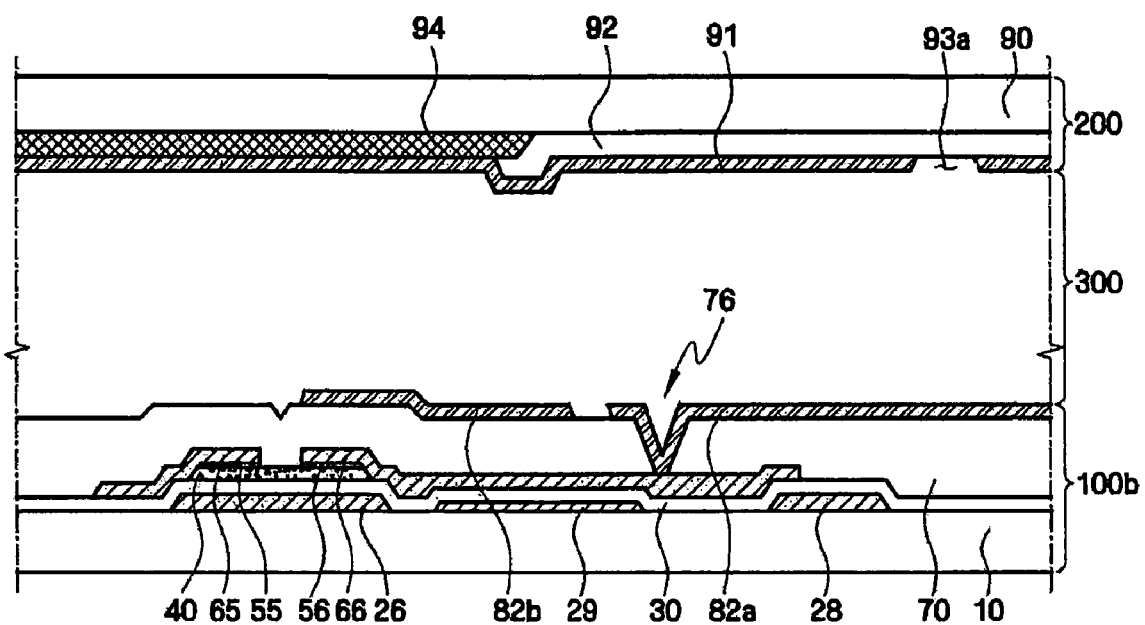
FIG. 8 is a sectional view of the liquid crystal display shown in FIG. 7 taken along the line VII-VII'.

Below, a liquid crystal display according to a third embodiment of the present invention is described in detail with reference to FIGS. 7 and 8. FIG. 7 is a plan view of a liquid crystal display according to a third embodiment of the present invention, and FIG. 8 is a sectional view of the liquid crystal display shown in FIG. 7 taken along the line VIII-VIII'. For convenience of description, components having substantially the same function as the exemplary embodiment shown in FIGS. 1 through 4 are identified by the same reference numerals, and detailed descriptions is not repeated.

Referring to FIGS. 7 and 8, the liquid crystal display according to the third embodiment has substantially the same structure as the liquid crystal display of the previous embodiment except that a floating electrode 29 is provided under an overlapping area of a second sub-pixel electrode 82b and a drain electrode 66.

The first sub-pixel electrode 82a and the second sub-pixel electrode 82b are capacitively coupled to each other through a drain electrode 66. That is to say, the first sub-pixel electrode 82a is connected to the drain electrode 66 via a contact hole 76, and the drain electrode 66 overlaps the second sub-pixel electrode 82b to form a capacitor.

The floating electrode 29 partially overlaps an overlapping area of the drain electrode 66 and the second sub-pixel electrode 82b. Here, the floating electrode 29 is completely insulated from the first sub-pixel electrode 82a and the second sub-pixel electrode 82b. The floating electrode 29 may be formed on the first insulating substrate 10 together with the gate line 22. More particularly, during forming of the gate line 22, the floating electrode 29 and the gate lines 22 may be formed using the same material to be insulated from each other, and a gate insulating layer 30 may be formed thereon.

The floating electrode 29 and the drain electrode 66 overlap each other to form a capacitor, which causes a voltage drop between the second sub-pixel electrode 82b and the drain electrode 66. That is to say, capacitance of the capacitor formed between the second sub-pixel electrode 82b and the first sub-pixel electrode 82a can be adjusted by adjusting the overlapping area of the floating electrode 29 and the drain electrode 66.

In addition, the drain electrode 66 partially overlaps the storage line 28 to form a storage capacitor. The shapes and positions of the drain electrode 66, the floating electrode 29, and the storage line 28 may vary in different manners according to the arrangement of pixels.

Figure 9:
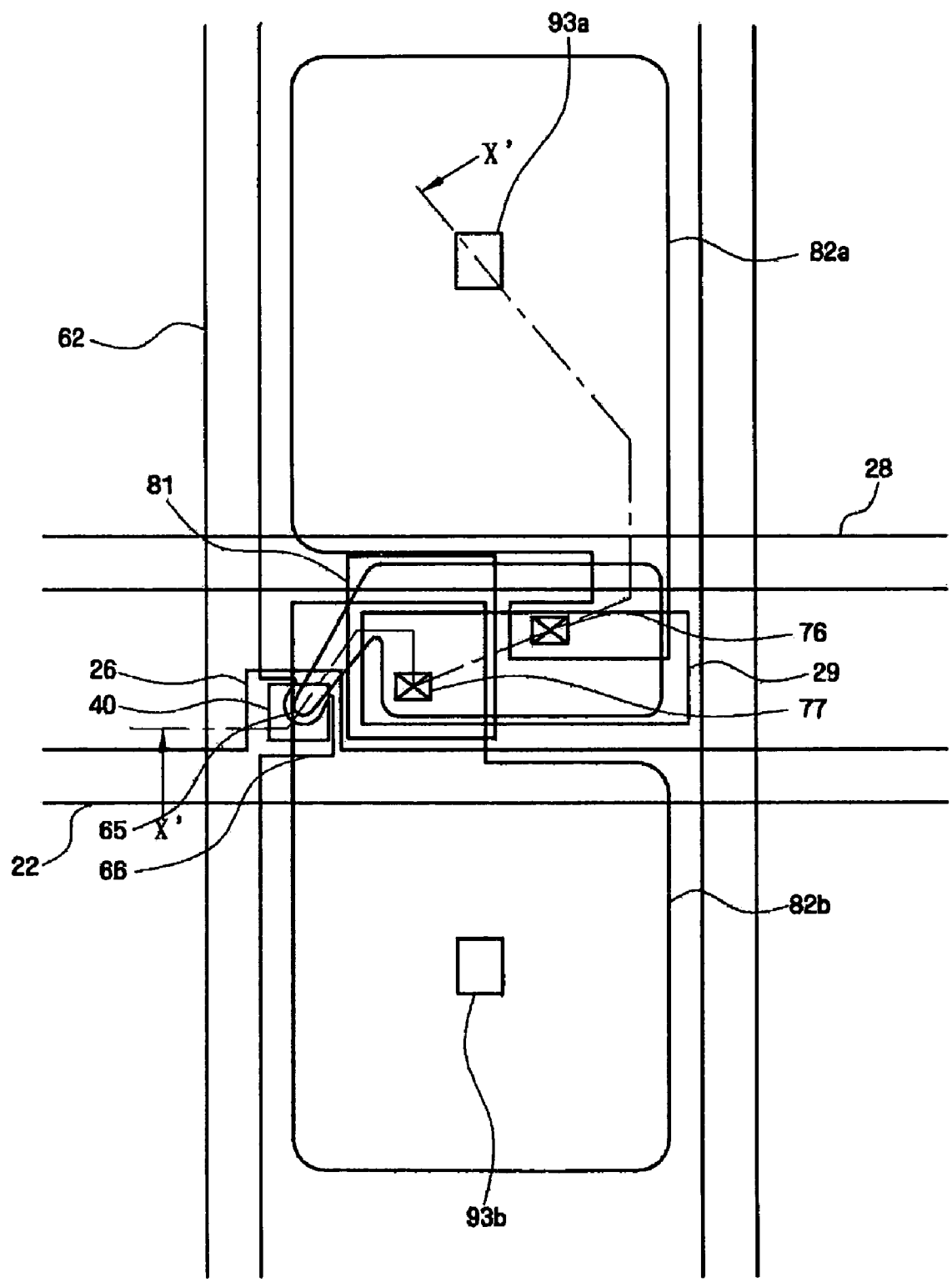
FIG. 9 is a plan view of a liquid crystal display according to a fourth embodiment of the present invention.
Figure 10:
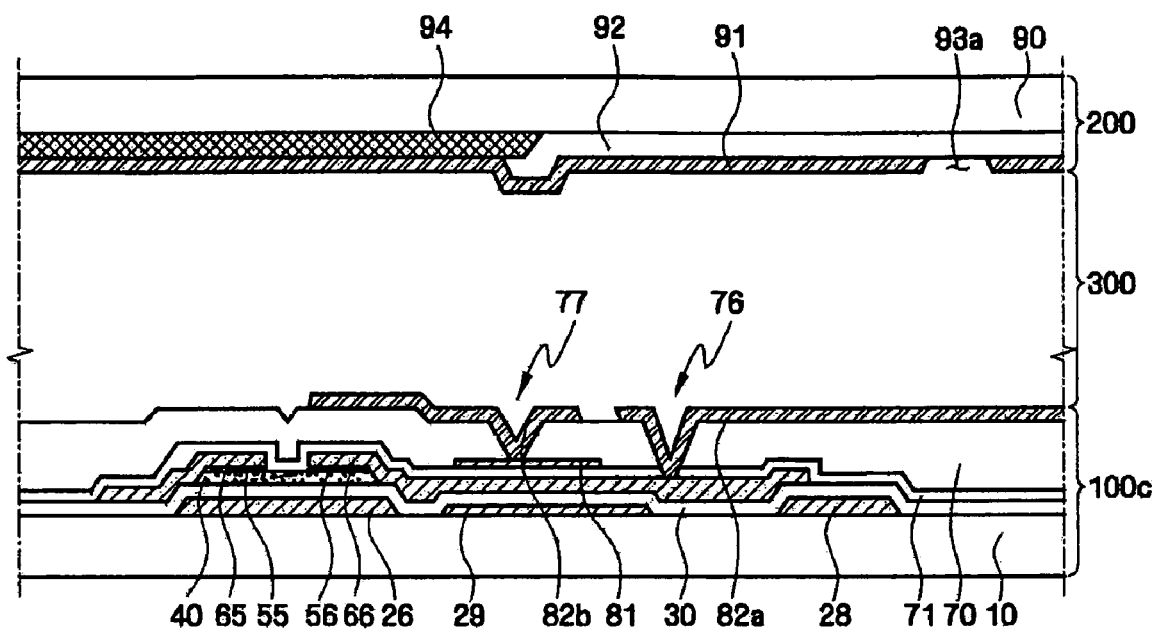
FIG. 10 is a sectional view of the liquid crystal display shown in FIG. 9 taken along the line X-X'.

Below, a liquid crystal display according to a fourth embodiment of the present invention will be described in detail with reference to FIGS. 9 and 10. FIG. 9 is a plan view of a liquid crystal display according to a fourth embodiment of the present invention, and FIG. 10 is a sectional view of the liquid crystal display shown in FIG. 9 taken along the line X-X'. For convenience of description, components having substantially the same function as the exemplary embodiment shown in FIGS. 1 through 4 are identified by the same reference numerals, and detailed descriptions are not repeated.

Referring to FIGS. 9 and 10, the liquid crystal display according to the fourth embodiment has substantially the same structure as the liquid crystal display of the previous embodiment except that the liquid crystal display includes a coupling electrode 81 connected to a second sub-pixel electrode 82b to form a capacitor together with a first sub-pixel electrode 82a, and a floating electrode 29 forming a capacitor together with the coupling electrode 81.

The first sub-pixel electrode 82a is connected to a drain electrode 66 via a contact hole 76, and the second sub-pixel electrode 82b is connected to the coupling electrode 81 via a contact hole 77. The drain electrode 66 and the coupling electrode 81 are capacitively coupled to each other to form a capacitor between the first sub-pixel electrode 82a and the second sub-pixel electrode 82b.

The floating electrode 29 is provided under an overlapping area of the second sub-pixel electrode 82b and the drain electrode 66. The floating electrode 29 reduces a voltage applied between the coupling electrode 81 and the drain electrode 66. The floating electrode 29 may be formed on the first insulating substrate 10 together with the gate line 22. More specifically, during forming of the gate line 22, the floating electrode 29 and the gate line 22 may be formed using the same material to be insulated from each other, and a gate insulating layer 30 may be formed thereon.

The coupling electrode 81 is insulated from the drain electrode 66 and is connected with the second sub-pixel electrode 82b through the contact hole 77. The coupling electrode 81 may be formed of a transparent material such as ITO or IZO, like the second sub-pixel electrode 82b. The coupling electrode 81 may also formed on an organic layer 71 coated on the drain electrode 66. Then, a passivation layer 70 is coated on the coupling electrode 81 to then form a contact hole 77, followed by forming the second sub-pixel electrode 82b, and connecting the coupling electrode 81 with the second sub-pixel electrode 82b.

While the present disclosure of invention has been particularly shown and described with reference to exemplary embodiments thereof, it will be understood by those of ordinary skill in the art in light of the foregoing that various changes in form and details may be made therein without departing from the spirit and scope of the present disclosure of invention. The above-described present embodiments are illustrative and not restrictive.

What is claimed is:

1. A liquid crystal display comprising:
a first electrically insulative substrate;
a gate line and a data line disposed on the first insulative substrate, the gate line intersecting the data line;
a switching element disposed on the first insulative substrate and operatively coupled to the gate line and the data line;
a first sub-pixel electrode disposed on the first insulative substrate and coupled by a direct current path to the switching element;
a second sub-pixel electrode disposed on the first insulative substrate and capacitively coupled to the first sub-pixel electrode;
a second electrically insulative substrate disposed spaced apart from, above and facing the first insulative substrate; and
a common electrode formed on the second insulative substrate to face the first and second sub-pixel electrodes and define electrical fields extending between the common electrode and the first and second sub-pixel electrodes;
wherein the second sub-pixel electrode has an upwardly directed protrusion in a portion thereof;
wherein the common electrode includes a first cut-out disposed above the first sub-pixel electrode and the common electrode includes a second cut-out disposed directly above and facing the upwardly directed protrusion.

2. The liquid crystal display of claim 1, wherein a width of the second cut-out is greater than a width of the first cut-out.

3. The liquid crystal display of claim 2, wherein the protrusion is part of a stacked structure having a lower layer and an upper layer, wherein the lower layer is formed from at least one of a same metal used for the gate line, a same metal used for the data line, and an organic layer, and further wherein the upper layer is formed of ITO or IZO.

4. The liquid crystal display of claim 2, wherein a width of the protrusion is less than a width of the second cut-out.

5. The liquid crystal display of claim 1, wherein a height of the protrusion is in a range of about 0.15 to about 0.4 µm.

6. The liquid crystal display of claim 1, wherein a shape of the first cut-out is rectangular or circular.

7. The liquid crystal display of claim 1,
wherein the switching element comprises a source electrode connected to the data line, and a drain electrode having one end facing to the source electrode and another end connected by the direct current path to the first sub-pixel electrode, wherein the drain electrode is capacitively coupled to the second sub-pixel electrode.

* * * * *